May 9, 1961   H. J. GALBRAITH   2,983,441
ELASTICA COMPUTER
Filed Dec. 20, 1957
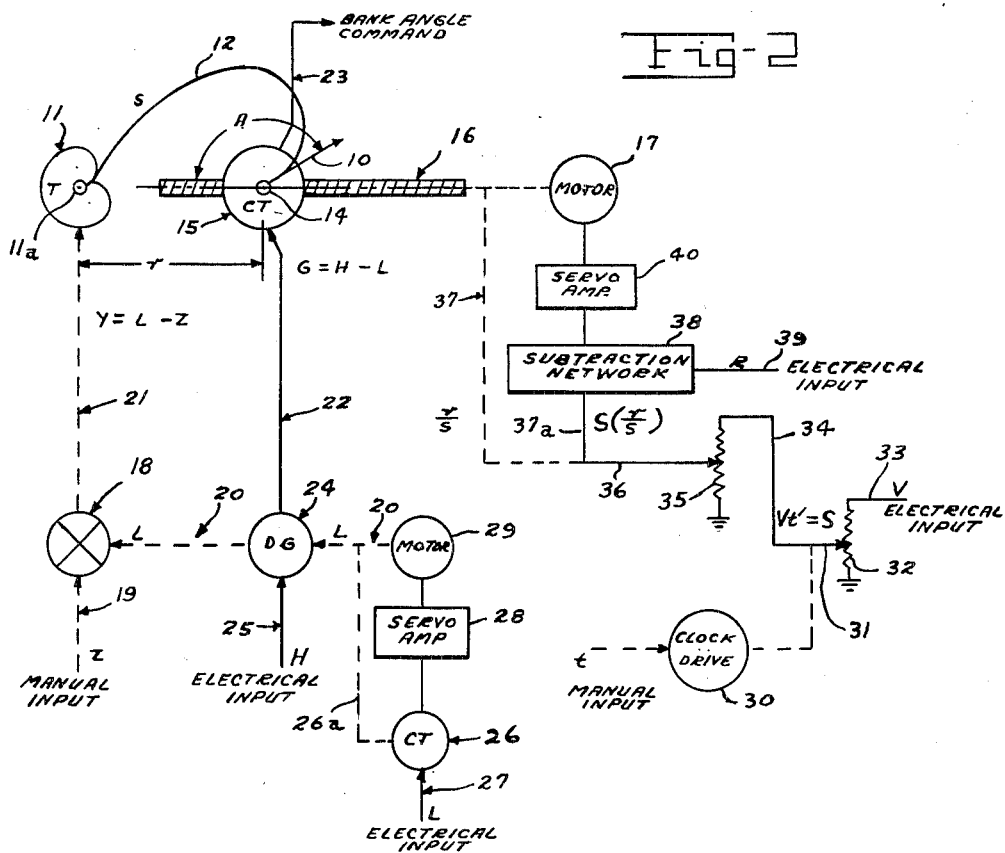
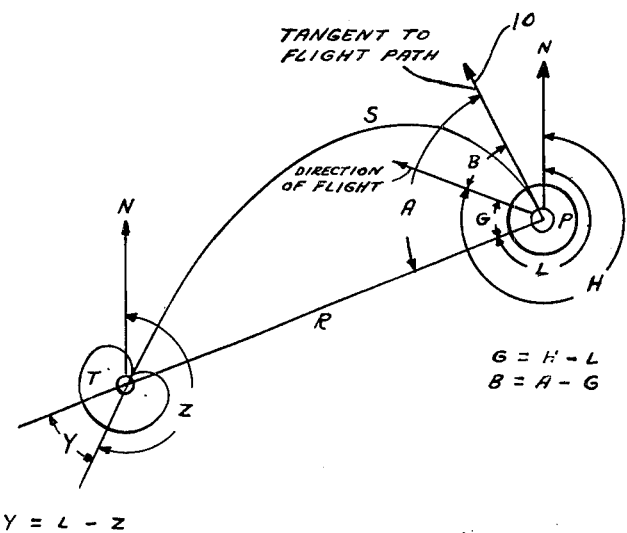
INVENTOR.
HUGH J. GALBRAITH
BY
ATTORNEYS United States Patent Office 2,983,441
Patented May 9, 1961

2,983,441
ELASTICA COMPUTER

Hugh J. Galbraith, Riverside, Calif., assignor to the United States of America as represented by the Secretary of the Air Force Filed Dec. 20, 1957, Ser. No. 704,218

12 Claims. (Cl. 235—61)

(Granted under Title 35, U.S. Code (1952), sec. 266)

The invention described herein may be manufactured and used by or for the United States Government for governmental purposes without payment to me of any royalty thereon.

This invention relates to an elastica computer and, more particularly, to a computer in which the output signal of a plurality of inputs to the computer is a nonlinear function of the input signals and is indicated through an elastic medium.

The present invention provides a solution to an analytical problem, which may involve seven or more variables, even though the exact analytical expression cannot be set forth. While the present invention will be described with respect to the flight of an aircraft, it will be understood that this computer may be employed, for example, to solve any analytical problem in which the analytical expression cannot be found.

The computer of the present invention provides guidance signals to a pilot and/or the autopilot of the aircraft to direct the aircraft to a preset destination point with advanced determination of the flight path direction and the time of arrival. The present invention relies on changing the flight path configuration of the aircraft as a means of controlling the time of arrival over the destination point. The computer of the present invention may be employed for coordinating tactical strikes, coordinating free fall and missile launching bombing runs, guiding and sequencing aircraft during return-to-base operations, guiding and sequencing aircraft during the enroute and initial approach phases of air craft control, effecting refueling rendezvous, and guiding drone aircraft for instrumenting atomic blasts.

An object of this invention is to provide a computer for producing an output signal that is a nonlinear function of two or more input signals.

Another object of this invention is to provide a computer employing an elastic medium or member, which is constrained in accordance with two or more input functions that may be variable, for performing a computation.

A further object of this invention is to provide a computer employing an elastic medium or member, which is constrained in accordance with two or more input functions that may be variable, to obtain a resulting torque at one or more points in the elastic medium.

Still another object of this invention is to provide a computer employing an elastic medium or member, which is constrained in accordance with two or more input functions, to obtain a resulting direction, referred to a suitable reference line, at one or both ends or at some intermediate point of the elastic medium or member.

Other objects of this invention will be readily perceived from the following description.

This invention relates to a computer including an elastic medium having a constant length. Suitable means supply an input function to each of the ends of the elastic medium or member to produce a nonlinear output signal through the elastic medium or member.

The attached drawing illustrates a preferred embodiment of the invention, in which:
Fig. 1 is a schematic view of a flight path from an aircraft to a target; and
Fig. 2 is a schematic view of the present invention for solving the problem of Fig. 1.

Referring to the drawing and particularly Fig. 1, there is shown a target T, which is located a distance R from the air position P of the aircraft along the line of sight between the position of the aircraft and the target. It is desired for the aircraft to fly over the target at an angle Z as measured from North, indicated by the arrow N in Fig. 1.

The angle of the line of sight from the position P of the aircraft to the target T is indicated by the angle L. The direction in which the aircraft is heading with respect to North is shown by the angle H. The angle G between the heading of the aircraft from the position P and the line of sight from the position P of the aircraft to the target T is the difference between the angles H and L.

From the position P, it is desired for the aircraft to approach the target in a specific period of time designated $t$. The velocity V of the aircraft is known so that the product of velocity times the specific period of time, $t$, is the distance S, which the aircraft must fly in order to reach the target T at the desired time $t$ with the velocity V of the aircraft. One such flight path of a distance S is shown in Fig. 1 and the computer of the present invention is employed to produce a flight path of distance S that the aircraft is capable of following.

It is necessary that the aircraft approach the target at the angle Z, as previously set forth. Thus, one end of the flight path having a length S must be tangent to the approach angle Z. A tangent to the desired flight path at the position P is indicated by the numeral 10. The angle A between the tangent 10 and the line of sight from the position P to the target T may be measured. Since the angle G between the heading of the aircraft and the line of sight from the position P to the target T is known as it is the difference between the angles H and L, the angle B between the present heading and the tangent 10 is the difference between the angles A and G. The angle B is the desired amount of turn or bank angle required of the aircraft in order to reach the path having the distance S.

The computer (see Fig. 2) of the present invention includes a member 11 with a shaft 11a having one end of a relatively elongated, interconnecting elastic medium or member 12 which member may be relatively stiff, resilient or flexible secured thereto. The elastic medium or member may be a wire or a flat spring or a coil spring, for example; it is only necessary that the elastic medium or member 12 have the properties of an elastic material. It is noted that the member 11, which represents the target position, may consist merely of a clamping block of brass or other suitable material. An important feature of the aforesaid member 11 is that the circumferential curvature thereof adjacent the end of the slot therein at which the member 12 emerges is formed equivalent or corresponding to the maximum rate-of-turn of the aircraft. In this manner, an aerodynamically safe flight-path program may be set up. The other end of the elastic medium or member 12 is connected to a shaft 14 of a control transformer 15. The rotatable shaft of said control transformer 15 is mechanically connected to a lead screw 16, which changes the position of the control transformer 15 with respect to the member 11 through a motor 17 connected thereto.

The member 11 represents the target T whereas the control transformer 15 indicates the position P of the aircraft. The elastic medium or member 12 is connected to the member 11 and the control transformer 15 to indicate the prescribed flight path from the position P of the aircraft to the target T. The distance between the connection of the elastic medium or member 12 to the shaft 11a of the member 11 and its connection to the shaft 14 of the control transformer 15, as measured on a predetermined path along which the control transformer 15 is moved by the motor 17 through the lead screw 16, is designated by $r$.

The member 11 is rotated through the angle Y by mechanical means. The angle Y is the angle between the line of sight from the position P to the target T and the angle of approach over the target T so that it is the difference between L and Z. A differential 18 has the angle of approach, Z, manually applied thereto through a shaft 19. The angle Z is constant and does not change since the desired angle of approach is one of the fixed inputs. However, the angle of the line of sight from the position P to the target T is constantly changing as the aircraft approaches the target T so that L is always varying. This, of course, creates a change in Y and the member 11 is rotated due to this difference. The angle L is supplied through a shaft 20 to the differential 18, which transmits change in the angle Y through a shaft 21 to rotate the member 11.

The angle G, which is the angle between the heading of the aircraft and the line of sight from the position P to the target T, is constantly varying because of the aircraft's attempt to reach the tangent 10 as its heading and the changing of the position P with respect to the targe T. The angle G is transmitted to the control transformer 15 through an electrical line 22. At the same time Y is also changing, as previously explained, so that the force exerted on the shaft 14 by the elastic medium or member 12 is varied. Since the control transformer 15 receives an electrical input through line 22 and a mechanical input through the shaft 14, it supplies the difference of these two angles, since the shaft rotation is proportional to the angle A as an electrical signal, through an electrical line 23 to indicate an angle B; the angle B is the bank angle needed to change the aircraft from its present heading to a heading along the tangent line 10.

The angle G is supplied to the control transformer 15 through the electrical line 22 from a differential generator 24. The differential generator 24 receives through a line 25 an electrical input of the angle H, which is always varying because of the change of the heading of the aircraft. The angle L is supplied to a control transformer 26 through an electrical line 27. The control transformer 26 is connected to the shaft 20, which extends through the differential generator 24 to the differential 18, by a mechanical connection 26a. The movement of the shaft 20 is transmitted to the control transformer 26 by the mechanical connection 26a so that any difference between the electrical input through the electrical line 27 and the shaft 20 is transmitted to a servoamplifier 28. The servoamplifier 28 sufficiently amplifies the signal of the error difference between the input of L and the position of the shaft 20 to energize a motor 29, which rotates the shaft 20 to correct the error difference.

The differential generator 24 receives the electrical input of H through a line 25 and the mechanical input of L through the shaft 20; the difference is supplied as G from the differential generator 24 through the line 22 to the control transformer 15. As the aircraft flies along the path shown in Fig. 1, it will be observed that the position P changes so that the angle L decreases; this decrease results in the motor 29 turning the shaft 20 to indicate the smaller angle. This, of course, changes both the angles G and Y.

The amount of time desired to reach the target T from the position P of the aircraft is indicated on a clock drive 30. The time is supplied manually to the clock drive 30 as $t$. The clock drive 30 indicates the time $t'$ as the time remaining for the aircraft to reach the target T. The time $t'$ is equal to the time $t$ when $t$ is supplied to the clock drive 30. As the time $t'$ decreases, the clock drive 30 moves the arm 31 of a potentiometer having a resistance 32. The velocity V is supplied through an electrical line 33 to the resistance 32. As the time $t'$ of the clock drive 30 decreases, the arm 31 is moved downwardly along the resistance 32 so that the voltage supplied through the arm 31 to a line 34 of a second potentiometer is directly proportional to the product $Vt'$ and this is equal to the distance S remaining between the position P of the aircraft and the target T along the flight path. The line 34 is connected to a resistance 35 of the second potentiometer.

As the motor 17 rotates the lead screw 16, the movement of the lead screw 16 is transmitted to an arm 36 of the second potentiometer through a connecting member 37. Since the distance $s$ of the elastic medium or member 12 is a constant length, the movement of the arm 36 of the potentiometer is directly proportional to the ratio of the distance $r$ between the shaft 11a of the member 11 and the shaft 14 of the control transformer 15 and the distance $s$ of the elastic medium or member 12. Thus, the movement of the arm 36 of the second potentiometer results in an electrical signal through the arm 36 and a line 37a proportional to the product of the distance S and the ratio of the distance between the shaft 11a of the member 11 and the shaft 14 of the control transformer 15 to the length of the elastic medium or member 12. An electrical signal proportional to the product $$\frac{S(r)}{s}$$

is supplied to a subtraction network 38 through the line 37a. The actual remaining distance R along the line of sight between the position P of the aircraft and the target T is supplied electrically through a line 39 to the subtraction network 38. If the product $$\frac{S(r)}{s}$$

and the distance R are not equal, the difference is transmitted as an error signal to a servoamplifier 40, which amplifies the signal and supplies it to drive the motor 17 to rotate the lead screw 16 to change the distance $r$ between the member 11 and the control transformer 15 to compensate for the change in the actual distance R between the position P and the target T along the line of sight.

Considering the operation of the present invention, it will be seen that the aircraft's position P with respect to the target T is similarly maintained through movement of the control transformer 15 with respect to the member 11 by rotation of the lead screw 16 through the motor 17. This maintains the ratio of the actual distance S along the desired flight path to the distance R between the position P to the target T along the line of sight in the same ratio as the constant length $s$ of the elastic medium or member 12 with respect to the distance $r$ along the axis of the lead screw 16 between the shaft 11a of the member 11 and the shaft 14 of the control transformer 15. Thus, one input variable, which is supplied to the computer of the present invention, is the distance R along the line of sight between the position P and the target T.

The member 11 is rotated in accordance with the angle Y, which varies constantly since the angle of the line of sight, L, is always varying as the aircraft changes position; this constitutes a second input variable. Since the angle Y is the difference between L and Z, this input actually represents two different inputs. Similarly, the control transformer 15 is constantly receiving an electrical signal proportional to the angle G. Since the angle G is the difference between the angle of the heading, H, and L, it will be observed that this input actually represents two other variable inputs because the variation of either of these angles produces a different value of G.

Since the elastic medium or member 12 has a torque applied at one end through angular displacement of the shaft 11a of the member 11 to which it is connected, the elastic medium or member 12 is constrained in accordance with its connection to the control transformer 15 through the shaft 14. Since the position of the shaft 14 in the control transformer 15 is proportional to the angle A, which is the angle of tangency of the elastic medium or member 12 with respect to the axis of the lead screw 16, the electrical signal output of the control transformer 15 indicates the bank angle B, which the aircraft must be made to turn to reach the desired flight path as shown by the elastic medium or member 12. The electrical input of G to the control transformer 15 tends to rotate the shaft 14 and thus exert a torque on one end of the elastic medium or member 12 should the aircraft be off course so that the elastic medium or member 12 gives a nonlinear output through its constrained configuration, which results in a nonlinear signal through the electrical line 23 of the control transformer 15.

As the aircraft approaches the target T, the control transformer 15 moves further from the member 11 so that the final position of the elastic medium or member 12 is directly in line with the axis of the lead screw 16. This, of course, produces the desired result as the aircraft is then approaching the target T along the desired angle of approach. Furthermore, when the elastic medium or member 12 is in line with the axis of the lead screw 16, there is no time remaining as the time remaining is dependent upon the difference between the length of the elastic medium or member 12 and the distance $r$ between the member 11 and the control transformer 15 along the axis of the lead screw 16.

While the present invention has been described with respect to a computer for plotting the path of an aircraft from a position P to a target T in a predetermined length of time with a predetermined angle of approach over the target, it will be understood that this computer may be employed for any device in which there is a plurality of input variables having an output signal that is a nonlinear function of the variable inputs.

An advantage of this invention is that it provides a solution to a theoretical or physical problem involving up to seven or more variables even though the exact analytical expression for the problem cannot be derived. This invention eliminates the requirement of data storage mechanism when a continuous solution to an analytical problem involving many variables is desired in a real time. A further advantage of this invention is that this computer has an infinitely large number of possible solutions for a variable set of input conditions. Another advantage of this invention is that the computer will provide a dynamic aircraft control signal that enables the aircraft to actually fly the same or similar path configuration to its destination with only a slight deviation despite the presence of external disturbances. A still further advantage of this invention is that the computer gives the pilot additional information in the form of a situation display wherein the configuration of the elastic medium or member shows the relative position of the aircraft and its destination and the shape of the flight path, which the aircraft may be expected to fly in order to satisfy the predetermined conditions of arrival at or over the destination. Because of its inherent simplicity, this computer may be fabricated in a sufficiently small package for installation in a lightweight medium space type of aircraft.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. In a computer, a flexible spring device having a constant length representing a predetermined distance between two preselected points and having at least one of its ends mounted for rotation only, means to apply a force to one end of said flexible device in response to an input signal, and means to apply a force to the other end of said flexible spring device in response to another input signal, said flexible spring device having attachment means mounting opposite ends thereof, said opposite ends respectively representing said preselected points and said flexible device being constrained in accordance with the input signals to produce a nonlinear, visual output signal through its configuration.

2. In a computer, an elastic, resilient member having a constant length representing a predetermined distance between two preselected points and having at least one of its ends mounted for rotation only, means to apply a force to one end of said elastic, resilient member in response to an input signal, means to apply a force to the other end of the elastic, resilient member in response to another input signal, said resilient member having attachment means mounting opposite ends thereof, said opposite ends respectively representing said preselected points and said resilient member being constrained in accordance with the input signals to produce a nonlinear, visual output signal through its configuration, and means to change the distance between the ends of the resilient member along a predetermined path translatably moving the other end thereof along the predetermined path with respect to the end of said resilient member mounted for rotation only in response to a further input signal.

3. In a computer, a relatively elongated, resilient member having a constant length representing a predetermined distance between two preselected points and having at least one of its ends mounted for rotation only, means to apply a force to one end of the resilient member in response to an input signal, means to apply a force to the other end of the resilient member in response to another input signal, means to change the force at the one end of the resilient member when the input signal varies, means to change the force at the other end of the resilient member when the other input signal varies, said resilient member having attachment means mounting opposite ends thereof, said opposite ends respectively representing said two preselected points and said resilient member including a control transformer for restraining one end thereof in accordance with the input signals to produce a nonlinear, visual output signal through its configuration, and means to change the distance between the ends of the resilient member along a predetermined path by translatably moving one end of the resilient member along the predetermined path with respect to the end of said resilient member mounted for rotation only in response to a further input signal.

4. In a computer, a relatively stiff member having a constant length representing a predetermined distance between two preselected points, one of the ends of the relatively stiff member being mounted for rotation only, rotatably mounted means secured to the end mounted for rotation only to supply an input signal thereto and corresponding to one of said two preselected points, control transformer means secured to the other end of the relatively stiff member to supply an input signal thereto and corresponding to the other of said two preselected points, means to move said control transformer means and the other end of the relatively stiff member on a predetermined path with respect to the end of the relatively stiff member mounted for rotation only in accordance with a further input signal to vary the distance between the ends of the relatively stiff member along the predetermined path up to said predetermined distance between said two preselected points, the movement of said control transformer means and the other end of said relatively stiff member producing a continuous nonlinear, visual output signal in accordance with the change in configuration of said relatively stiff member produced by said movement.

5. In a computer, a resilient, elastic medium having a constant length representing a predetermined distance between two preselected points, one of the ends of the resilient, elastic medium being mounted for rotation only, means secured to the end mounted for rotation only to apply a force thereto in accordance with an input signal manually set thereon and corresponding to one of said two preselected points, electrical control means secured to the other end of the resilient, elastic medium to apply a force thereto in accordance with another input signal and corresponding to the other of said two preselected points, and means to move the electrical control means and the other end of the resilient, elastic medium on a predetermined path with respect to the end of the resilient, elastic medium mounted for rotation only in accordance with a further input signal to vary the distance between the ends of the resilient, elastic medium along the predetermined path up to said predetermined distance between said two preselected points, the configuration of said resilient, elastic medium varying in accordance with the position of said electrical control means to produce a visual output signal as a nonlinear function of the input signals.

6. In a computer, a flexible, elastic medium having a constant length representing a predetermined distance between two preselected points, one of the ends of the flexible, elastic medium being mounted for rotation only, means secured to the end mounted for rotation only to apply a force thereto in accordance with an input signal and corresponding to one of said two preselected points, means to change the force at the end mounted for rotation only of the flexible, elastic medium when its input signal varies, means secured to the other end of the flexible, elastic medium to apply a force thereto in accordance with another input signal, control transformer means corresponding to the other of said two preselected points and operative to change the force at the other end of the flexible, elastic medium when its input signal varies, means to move the control transformer means secured to the other end of the flexible, elastic medium and the other end of the flexible, elastic medium on a predetermined path with respect to the end of the flexible, elastic medium mounted for rotation only in accordance with a further input signal to vary the distance between the ends of the flexible, elastic medium along the predetermined path up to said predetermined distance between said two preselected points, said means comprising motor control means adapted for connection to the rotatable shaft of said control transformer means and electric circuit means interconnected to the input of said motor control means for applying a continuous input signal thereto in accordance with a change in distance between the end mounted for rotation only and the movable end of said flexible, elastic medium, the configuration of said flexible, elastic medium producing a visual output signal as a nonlinear function of the input signals.

7. In a computer, a relatively resilient, elastic medium having a constant length representing a predetermined distance between two preselected points, means secured to one of the ends of the relatively resilient, elastic medium to mount the end in position for rotation only and apply a force thereto in response to an input signal and corresponding to one of said two preselected points, means secured to the other of the ends of the relatively resilient, elastic medium to apply a force thereto in response to an input signal and corresponding to the other of said two preselected points, electrical control means connected to said last-mentioned means to move said means and the other end of the relatively resilient, elastic medium along a predetermined path with respect to the end thereof mounted for rotation only to vary the distance between the ends of the relatively resilient, elastic medium along the predetermined path up to said predetermined distance between said two preselected points, said electrical control connecting means being responsive to an input signal delivered thereto, and said means secured to the other end of the relatively resilient, elastic medium including control transformer means to produce a visual output signal in accordance with the movement of said last-mentioned means as a function of the input signals to the relatively resilient, elastic medium.

8. In a computer, a relatively elongated, flat spring element having a constant length representing a predetermined distance between two preselected points, rotatably mounted means secured to one of the ends of said flat spring element to mount the end in position for rotation only and apply a force thereto in response to an input signal manually applied to said rotatably mounted means, electromechanical means secured to the other of the ends of the flat spring element to apply a force to said other end in response to an input signal applied to said electromechanical means, motor means connected to said electromechanical means to move said means and the other end of the flat spring element along a predetermined path with respect to the end thereof mounted for rotation only to vary the distance therebetween along the predetermined path up to said predetermined distance between said two preselected points, said motor-connecting means being responsive to an input signal applied thereto in accordance with a time function set on a clock device electrically interconnected therewith, and the flat spring element being constrained to produce a configuration varying with the changing distance between the two ends of said flat spring element and thus effect a visual output signal as a nonlinear function of the input signals to the flat spring element through its configuration.

9. In a computer for determining the flight path of an aircraft from its present position to a target with a predetermined angle of approach over the target in a predetermined period of time from its present position, a relatively elongated, resilient, elastic member having a constant length with one end of the resilient, elastic member representing the target and the other end thereof representing the aircraft whereby the configuration of the relatively elongated, resilient member represents the flight path of the aircraft, means secured to said one end of said resilient, elastic member to hold said member for rotation only, means secured to said other end of the elastic member, means connected to said last-mentioned means to translatably move the other end of the resilient, elastic member and the last-mentioned means along a predetermined path with respect to the one end of the resilient, elastic member to vary the distance along the predetermined path whereby the difference between the constant length of the resilient, elastic member and the distance along the predetermined path between the two ends of the resilient, elastic member is directly proportional to the length of time remaining before the aircraft reaches the target, means to rotate the means secured to said one end of the resilient, elastic member in accordance with the angular difference between the aircraft to target line of sight and the angle of approach over the target, and means to rotate the means secured to said other end of the resilient, elastic member in accordance with the angular difference between the aircraft heading and the aircraft to target line of sight, said resilient, elastic member having its configuration represent the desired flight path of the aircraft.

10. In a computer for determining the flight path of an aircraft from its present position to a target with a predetermined angle of approach over the target in a predetermined period of time from its present position, a relatively elongated, flexible elastic medium having a constant length with one end thereof representing the target and the other end thereof representing the aircraft whereby the relatively elongated, flexible elastic medium represents the flight path of the aircraft, means secured to said one end of said relatively elongated, flexible elastic medium to mount said member for rotation only, means secured to said other end of the relatively elongated, flexible elastic medium, means connected to said last-mentioned means to translatably move the other end of the relatively elongated, elastic medium and the last-mentioned means along a predetermined path with respect to the one end of the relatively elongated, flexible elastic medium to vary the distance along the predetermined path up to the full extent of said constant length flexible elastic medium whereby the difference between the constant length of said flexible elastic medium and the distance along the predetermined path between the two ends of the flexible elastic medium is directly proportional to the length of time remaining before the aircraft reaches the target, means to rotate the means secured to said one end of the flexible elastic medium in accordance with the angular difference between the aircraft to target line of sight and the angle of approach over the target, and means to rotate the means secured to said other end of the flexible elastic medium in accordance with the angular difference between the aircraft heading and the aircraft to target line of sight, said means secured to said other end of the flexible elastic medium including means to visually indicate the bank angle of the aircraft required to arrive on the desired flight path.

11. In a computer for determining the flight path of an aircraft from its present position to a target with a predetermined angle of approach over the target in a predetermined period of time from its present position, interconnecting, relatively stiff elastic medium means having a constant length with one end thereof representing the target and the other end thereof representing the aircraft whereby the configuration of the interconnecting, relatively stiff elastic medium means represents the flight path of the aircraft, means secured to said one end of said relatively stiff, elastic medium means to mount the same for rotation only, means secured to said other end of the relatively stiff elastic medium means, means connected to said last-mentioned means to move the other end of the relatively stiff elastic medium means and the last-mentioned means along a predetermined path with respect to the one end of the relatively stiff elastic medium means to vary the distance along the predetermined path up to the full extent of said constant length elastic medium means whereby the difference between the constant length of said relatively stiff elastic medium means and the distance along the predetermined path between the two ends thereof is directly proportional to the length of time remaining before the aircraft reaches the target, means to rotate the means secured to said one end of said interconnecting elastic medium means in accordance with the angular difference between the aircraft to target line of sight and the angle of approach over the target, means to rotate the means secured to said other end of the interconnecting, relatively stiff elastic medium means in accordance with the angular difference between the aircraft heading and the aircraft to target line of sight, and means to actuate said connected means to move said means secured to the other end of the interconnecting, relatively stiff elastic medium means along the predetermined path in accordance with the time remaining to reach the target whereby the configuration of the relatively stiff elastic medium means represents the desired flight path of the aircraft.

12. In a computer for determining the flight path of an aircraft from its present position to a target with a predetermined angle of approach over the target in a predetermined period of time from its present position, a resilient, relatively elongated flat elastic medium having a constant length representing the predetermined distance from the present position of the aircraft to the target with one end thereof representing the target and the other end thereof representing the aircraft whereby the configuration of the resilient, relatively elongated flat elastic medium represents the flight path of the aircraft, means secured to said one end of said resilient, relatively elongated flat elastic medium to mount the same for rotation only, means secured to said other end of the resilient, relatively elongated flat elastic medium, means connected to said last-mentioned means to translatably move the other end of the resilient elastic medium and the last-mentioned means along a predetermined path with respect to the one end thereof to vary the distance along the predetermined path up to the full extent of said constant length resilient elastic medium whereby the difference between the constant length of the resilient elastic medium and the distance along the predetermined path between the two ends thereof is directly proportional to the length of time remaining before the aircraft reaches the target, means to rotate the means secured to said one end of the resilient elastic medium in accordance with the angular difference between the aircraft to target line of sight and the angle of approach over the target, means to rotate the means secured to said other end of the resilient elastic medium in accordance with the angular difference between the aircraft heading and the aircraft to target line of sight, and means to actuate said connected means to move said means secured to the other end of the resilient elastic medium along the predetermined path in accordance with the time remaining to reach the target, said means secured to said other end of the resilient elastic medium including means to visually indicate the bank angle of the aircraft required to arrive on the desired flight path.

References Cited in the file of this patent

UNITED STATES PATENTS

| | | |
|---|---|---|
| 2,394,284 | Berges | Feb. 5, 1946 |
| 2,643,055 | Sorteberg | June 23, 1953 |